United States Patent [19]

Norota et al.

[11] 4,288,484
[45] Sep. 8, 1981

[54] NOVEL FIBROUS ASSEMBLY AND PROCESS FOR PRODUCTION THEREOF

[75] Inventors: Susumu Norota; Tsutomu Kiriyama; Tadasi Imoto, all of Iwakuni, Japan

[73] Assignee: Teijin Limited, Osaka, Japan

[21] Appl. No.: 46,753

[22] Filed: Jun. 8, 1979

[30] Foreign Application Priority Data

Jun. 13, 1978 [JP] Japan .................................. 53-70315
Nov. 21, 1978 [JP] Japan ................................ 53-142817

[51] Int. Cl.³ .............................................. B32B 5/12
[52] U.S. Cl. .................................. 428/113; 264/46.1;
264/DIG. 8; 428/156; 428/172; 428/195;
428/233; 428/245; 428/247; 428/253; 428/255;
428/284; 428/288; 428/296; 428/297; 428/298;
428/369; 428/373; 428/397
[58] Field of Search ................... 264/DIG. 8, 46.1;
428/113, 131, 255, 288, 374, 369, 397, 107, 373,
156, 172, 195, 233, 245, 247, 253, 284, 296, 298,
302, 303

[56] References Cited

U.S. PATENT DOCUMENTS

| 3,539,666 | 11/1970 | Schirmer | 264/51 |
| 3,549,467 | 12/1970 | Keuchel | 156/72 |
| 3,594,459 | 7/1971 | Keuchel | 264/DIG. 8 |
| 3,594,928 | 7/1971 | Noel | 35/50 |
| 3,965,229 | 6/1976 | Driscoll | 264/DIG. 8 |
| 3,969,472 | 7/1976 | Driscoll | 264/DIG. 8 |
| 3,980,513 | 9/1976 | Omori et al. | 264/51 |

FOREIGN PATENT DOCUMENTS 1114151  5/1968  United Kingdom .

Primary Examiner—James J. Bell
Attorney, Agent, or Firm—Sherman & Shalloway

[57] ABSTRACT

A fibrous assembly of many fibers, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; at least 40% of the entire cross-sectional area of each fiber consisting of at least two different polymer phases which are coalesced side-by-side as at least two irregular blocks; and each of the individual fibers of said assembly having a non-uniform cross-sectional shape along its longitudinal axis; fibrous structures prepared from a plurality of such fibrous assemblies; and a process for producing such fibrous assembly.

17 Claims, 13 Drawing Figures

NOVEL FIBROUS ASSEMBLY AND PROCESS FOR PRODUCTION THEREOF

This invention relates to a novel assembly of many fibers, and more specifically, to a novel fibrous assembly in which many fibers are interconnected at random in a spaced-apart relationship to provide a substantially integral structure.

According to this invention, there is provided a novel fibrous assembly (to be sometimes referred to as the "fibrous assembly A of the invention") consisting of many fibers, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point there-along; at least 40% of the entire cross-sectional area of each fiber consisting of at least two different polymer phases which are coalesced side-by-side as at least two irregular blocks; and each of the individual fibers of said assembly having a non-uniform cross-sectional shape along its longitudinal axis.

To facilitate the understanding of the present invention, various drawings are attached to this application.

BRIEF DESCRIPTION OF THE DRAWINGS

FIG. 3, E is the same as FIG. 3, A except that it is enlarged to 6000 times.

The portions which look black in FIGS. 3 E are a polymer phase B consisting of 6-nylon and polypropylene in a weight ratio of 70:30, and the portions which look white in these photographs are a polymer phase A consisting of a polyester elastomer and polypropylene in a weight ratio of 80:20. In FIG. 3 E, the polymer phase B is seen as a surface-roughened portion.

FIBROUS ASSEMBLY

Figure 1:
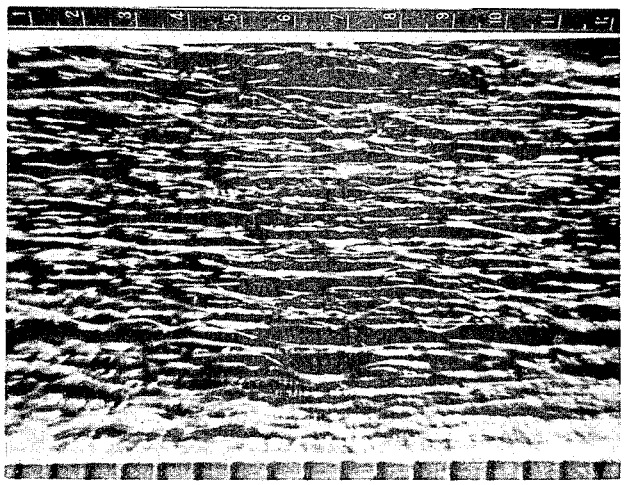
FIG. 1 is a photograph of the unextended fibrous assembly of the invention produced in Example 14 given hereinbelow which was taken right from above. One smallest graduation in the scale below corresponds to 2 mm.
Figure 2:
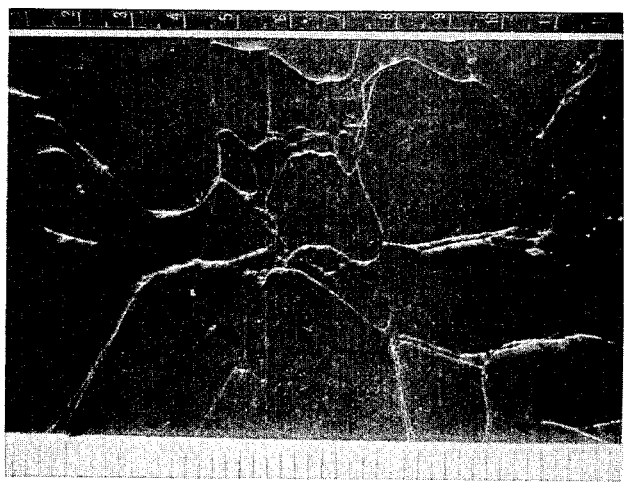
FIG. 2 is a photograph taken right from above of the fibrous assembly of FIG. 1 after it was spread in a direction at right angles to the longitudinal axes of the fibers (to be sometimes referred to hereinbelow as "transverse direction").

In the non-spread state, the fibrous assembly of this invention looks like an assembly of numerous ultrafine fibers aligned orderly in the direction of longitudinal axes of the fibers (see FIG. 1). When it is spread in a direction at right angles to the longitudinal axes of the fibers (in the transverse direction), the individual fibers are interconnected at random at irregularly spaced intervals to provide a continuous substantially unitary reticulated structure in which the sizes and shapes of the individual meshes are non-uniform, as shown in FIG. 2. Accordingly, the fibrous assembly of the invention essentially differs from known assemblies of separated spun fibers.

It is appreciated from FIGS. 3, A, B, C and D that (1) when the fibrous assembly of this invention is cut at right angles to the longitudinal axes of the fibers at an arbitrary point therealong, the cross sections of the individual fibers are asymetrical and irregularly-shaped with substantially different profiles from one another; and (2) each of the constituent fibers of the assembly has a non-uniform cross-sectional shape along its longitudinal axis.

Figure 3A:
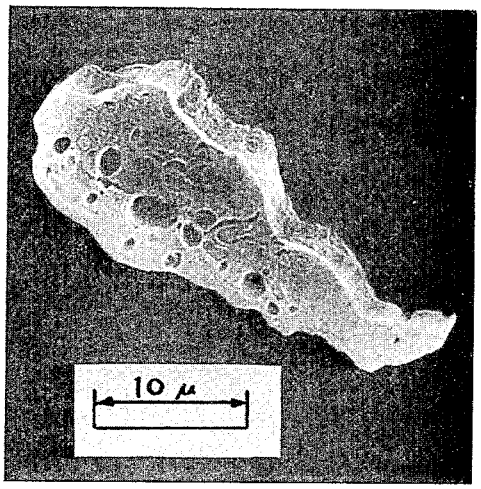
FIGS. 3, A, B, C and D are microphotographs of the cross sections of the fibrous assembly shown in FIG. 1, which were obtained by cementing the fibrous assembly with paraffin and cutting it in a direction at right angles to the longitudinal axes of the fibers at intervals of 6 mm along said longitudinal axes. One smallest graduation in the scale below each photograph corresponds to 10 microns.
Figure 3B:
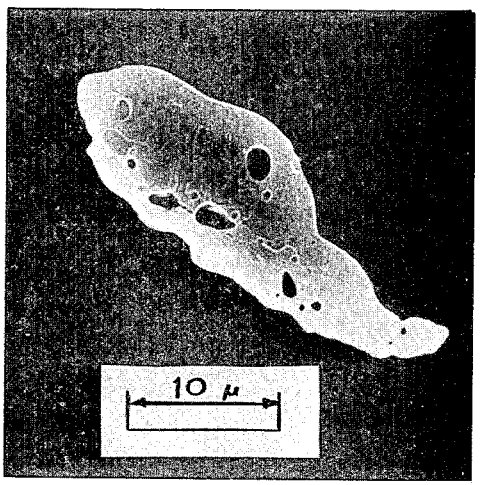
Figure 3C:
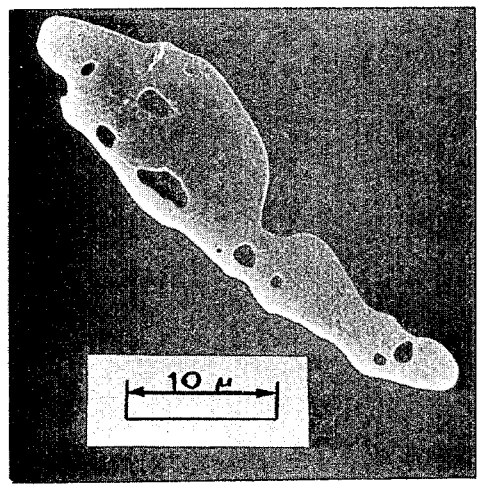
Figure 3D:
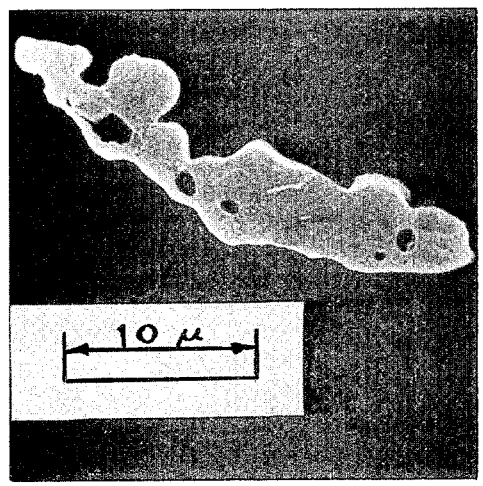
Figure 3E:
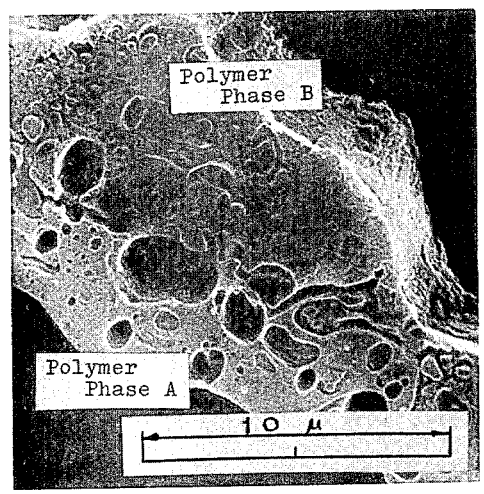
Figure 4:
FIG. 4 is an electron microphotograph of the cross section of fibers in the fibrous assembly shown in FIG. 1 at a different portion from the portions cut in FIG. 3. One smallest graduation in the scale below the photograph corresponds to 10 microns.
Figure 5:
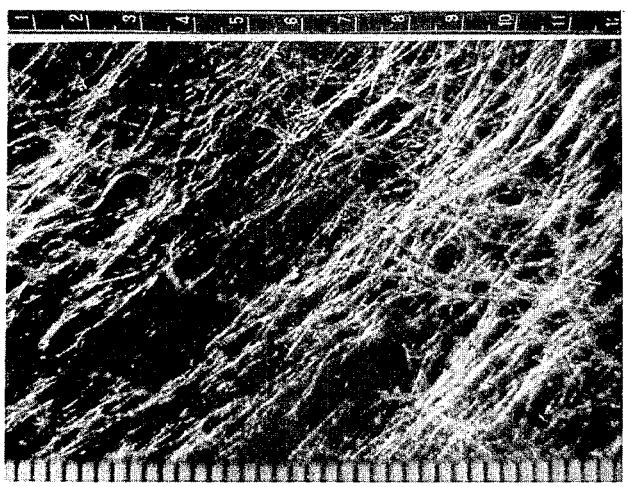
FIG. 5 is a photograph, similar to FIG. 1, and taken right from above, of a structure obtained by spreading 16 fibrous assemblies of the type shown in FIG. 1 and stacking the spread assemblies.

It is further seen from FIG. 3E and FIG. 4 that (3) in the fibrous assembly of the invention, at least 40% of the entire cross-sectional area of each fiber consists of at least two different polymer phases which are coalesced side-by-side as at least two irregular blocks. This constitutes an important feature and advantage of the fibrous assembly of this invention.

The many fibers which constitute the fibrous assembly of this invention, as seen from FIGS. 3, A, B, C and D, have cross sections of irregularly varying profiles and sizes when the fibrous assembly is cut in the transverse direction at an arbitrary point of the assembly, and each of the fibers has a cross section irregularly varying in shape and size along the fiber axis.

The following observation can be made on these cross sections of the fibers which vary irregularly in shape and size when the fibrous assembly is cut at an arbitrary point in the transverse direction. Let the length of the maximum long axis of one cross section be x and the length of the maximum shot axis at right angles to the maximum long axis be y, then the average diameter (z) of each fiber is given by the following equation (1).

$$z = \frac{x + y}{2} \tag{1}$$

When the average diameter (z) of any 100 fiber sections is measured on the basis of their microphotographs, at least 80%, particularly at least 90%, of the cross sections of the fibers preferably have an average diameter (z) of from 0.05 micron to 60 microns.

Furthermore, the average ($z_{100}$) of the average diameters of the 100 fiber cross-sections mentioned above which is given by the following equation (2) is preferably in the range of from 3 microns to 40 microns, especially from 5 microns to 35 microns.

$$z_{100} = \left( \sum_{i=1}^{100} Z_i \right) \cdot 1/100 \tag{2}$$

As stated above, when the fibrous assembly of this invention is spread in the transverse direction, it forms a reticulated structure. The intersecting points of the reticulated structure is substantially Y-shaped. The individual fibers are branched in Y-shape to form irregular meshes of varying shapes and sizes. The fibrous assembly of this invention may be spread in the transverse direction to two times with a care taken not to cut the intersecting points. The distance ($l_i$) between the intersecting portions or points in any area, 10 cm$^2$ in size, of the spread fibrous assembly is measured by a caliper with regard to each mesh. The value (l) obtained by dividing the sum of li by the number (n) of measurements is defined as the average distance between the intersecting points as shown in equation (3).

$$l = \left( \sum_{i=1}^{n} l_i \right) \cdot 1/n \tag{3}$$

The fibrous assembly of this invention preferably has an average distance (l) between the intersecting points of from 1 mm to 50 mm, especially from 2 mm to 30 mm.

As already stated hereinabove, at least 40% of the cross sections of the fibers which appear when the fibrous assembly of this invention is cut in the transverse direction at an arbitrary point therealong consist of at least two different polymer phases coalesced side-by-side as at least two irregular blocks (to be referred to as coalesced blocks of dissimilar polymer phases). When the fibers composed of such coalesced blocks of dissimilar polymer phases are, for example, stretched, beaten, rubbed or heated, one polymer phase can be split from the other polymer phase, thereby making the fibers finer in size. Or when polymer phases having different percent shrinkages are used as the dissimilar polymer phases, heat-treatment of the fibrous assembly results in irregular three-dimensional crimps with a very high percent crimp not seen in conventional bulky yarns.

It is preferred therefore that the coalesced blocks of at least two dissimilar polymer phases should be present in as many areas as possible in the fiber section. Preferably, such coalesced blocks of dissimilar polymers should be present in at least 50%, above all at least 60%, of the fiber cross sections which appear when the fibrous assembly is cut in the transverse direction.

The side-by-side coalesced blocks of dissimilar polymer phases as referred to in this invention differ from known microblends of dissimilar polymers, and as shown in FIG. 3E, at least two dissimilar polymer phases, for example polymer phase A and polymer phase B, form blocks of irregular shapes which are coalesced side-by-side irregularly. Since the polymer phase A and the polymer phase B are irregularly aligned side-by-side to form a fiber cross section, the polymer phase A and the polymer phase B are coalesced as blocks in an irregular side-by-side fashion while they alternately appear on the surface of the fiber. Accordingly, both the polymer phase A and the polymer phase B have an irregularly-shaped cross section.

In the side-by-side coalesced blocks of at least two dissimilar polymer phases, it is preferred that at least two polymer phases, for example polymer phase A and polymer phase B, respectively form a continuous phase, and at least one of such polymer phases should be present as a block which will occupy at least 15%, especially at least 20%, of the cross section of the fiber. This makes it possible to produce a better fibrous assembly of finer fibers and/or high percent crimp by splitting.

It is also preferred that the total volume of at least two dissimilar polymer phases, for example polymer phase A and polymer phase B, which constitute the fibrous assembly of this invention should be at least 80%, especially at least 85%, above all at least 90% of the entire polymer components which constitute the fibrous assembly, and the volume ratio of polymer phase A to polymer phase B should be from 70:30 to 30:70, especially from 65:35 to 35:65, above all from 60:40 to 40:60.

As stated hereinabove, the shapes and sizes of the cross sections of the many fibers constituting the fibrous assembly of this invention are non-uniform along the fiber axes. Accordingly, at different cross sections of each fiber along its axis, the ratio of the polymer phase A to the polymer phase B and the profiles and sizes of the blocks of these polymer phases are different.

At least two dissimilar polymer phases in the present invention may be phases of different kinds of single polymers, or phases of the same kinds of polymers having different degrees of polymerization or crystallization, or different polymer phases in the form of microblend, or phases of combinations of these.

Examples of different single polymers are thermoplastic polymers having quite different chemical compositions, for example polyethylene, polypropylene, polyacrylonitrile, polyvinyl chloride, polystyrene, vinyl fluoride copolymers, polyacetal, ionomer resin, acrylate resins, vinyl acetate polymers, polyvinyl alcohol, copolymers of vinyl monomers and diene compounds, polyamides, polyesters, polycarbonates, polyurethans, polyolefinic elastomers, and polyester elastomers.

Examples of a combination of a polymer microblend and a single polymer, or a combination of different polymer microblends with each other are a combination of 100% of nylon as polymer phase B (high melting point) and a polymer phase A (low melting point) which is a blend polymer composed of 40% of nylon and 60% of polypropylene; a combination of a blend of 80% of nylon and 20% of polypropylene as polymer phase B and a blend of 30% of nylon and 70% of polypropylene as polymer phase A. These combinations of polymer phases A and B are also included within the definition of the dissimilar polymer phases. It is preferable to combine polymer phase A and polymer phase B which have little or no compatibility with each other, but which differ to a certain degree from each other in physical properties, especially heat shrinkage, solubility in or swellability with solvents or in softening point or melting point, for example to combine polymer phases having average softening points differing from each other by 5° to 50° C., or those having different electrical characteristics.

Manufacturing Process

The fibrous assembly of this invention can be produced, for example, by extruding at least two different foamable polymer phases in the molten state from different extruders into polymer pipes, associating these molten extrudates before they reach a die, extruding the resulting polymer stream from a die having an elongated slit with a clearance of not more than 0.5 mm, and taking up the extrudate while quenching it with a cooling medium such as air or water.

A similar method to the above method is disclosed, for example, in U.S. Pat. No. 3,954,928 although it differs from the method of this invention in that it uses a single polymer phase.

The die used in manufacturing the fibrous assembly of this invention may be an I-die, a T-die or a circular die. It is important in the present invention that at least two different foamable polymer phases should be extruded as an associated stream from the slit in such a way that at least two different polymer phases form overlapping layer-like flows in the widthwise direction in the narrow width of the slit throughout the largest possible length of the slit (in the longitudinal direction of the slit clearance). Most preferably, molten masses of at least two different polymer phases are extruded while they overlap each other as at least two layers over the entire length of the slit, and this can give a fibrous assembly of the highest quality. Desirably, these molten polymer masses are extruded so that they overlap each other as layer-like flows over at least 90%, especially at least 95%, of the entire length of the slit.

The surfaces of the molten masses of at least two dissimilar polymer phases extruded from the slit exit which overlap in layers need not always to be of a planar shape, and the cross sections of various shapes may overlap in an undulate plane.

At least two polymer phases can be melted by heating them to a suitable temperature of 100° to 350° C.

When it is desired to obtain a fiber assembly of especially high quality, the clearance of the slit is preferably within the range of 30 to 300 microns. Especially when a fibrous assembly having a small fiber denier is desired, it is especially preferred to use a slit having a clearance of 30 to 150 microns.

Figure 8:
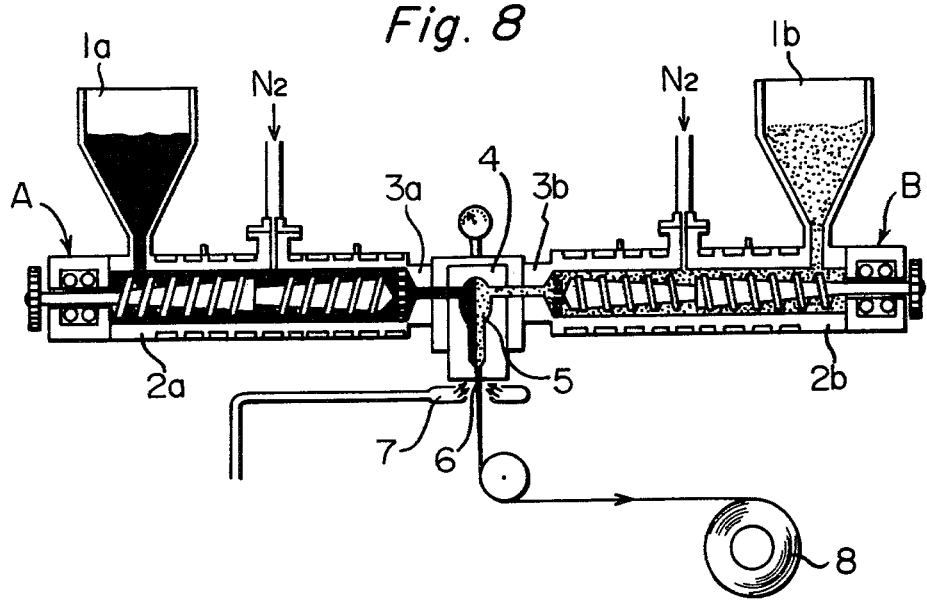
FIG. 8 is a schematic side elevation view of the extruding apparatus used in the process of the present invention.

The fibrous assembly of this invention can be produced by using an apparatus shown, for example, in FIG. 8.

The apparatus shown in FIG. 8 includes two extruder systems A and B. Two different polymers are fed respectively from hoppers 1a and 1b into vent-type extruders 2a and 2b. N₂ gas is introduced into the vent portions of these extruders, and the polymers are each kneaded in the molten state to prepare different foamable molten polymer phases A and B separately. These polymer phases A and B are sent to an associating chamber 5 of a die 4 through polymer pipes 3a and 3b, and extruded through a slit exit 6 of the die 4 while they overlap in layer form. The bubbles dispersed in the polymers expand after extrusion, and change to cracks by being cooled with a cooling air from an air feed opening 7. Thus, finally, a fibrous assembly is obtained which when spread, becomes a reticulated structure.

Preferably, the cooling of the polymers at the slit exit 6 should be performed by spraying a gas such as air or steam to the polymers immediately rearward of the slit exit, especially at a place between the slit exit and a point 10 mm below it especially 5 mm below it, while applying a draft to the polymers so that these polymers may be solidified in fibrous form. The draft ratio is preferably from 50 to 250, especially from 100 to 200. The draft ratio, as used herein, is defined as follows:

$$\frac{\text{the take-up speed (cm/min.) at which the fibrous assembly is taken up}}{\text{the linear speed (cm/min.) of the molten polymers at the slit exit}}$$

The foamable substance to be included into the dissimilar polymer phases in the manufacturing process of this invention may be any substances which generate gases when the molten polymer phases are extruded from the slit exit. The foamable substances include not only gaseous foamable substances, but also solid or liquid substances which generate gases by decomposition or by reaction with the molten polymer phases. Feasible methods for foaming include, for example, (a) a method which comprises mixing a normally gaseous substance such as nitrogen gas, carbon dioxide gas, helium, propane or butane with a molten thermoplastic resin; (b) a method which comprises mixing a substance which is normally liquid but becomes gaseous at the melting temperature of a thermoplastic resin, such as water, with the thermoplastic resin, (c) a method which comprises mixing a substance capable of generating a gas upon decomposition, such as a diazo compound (e.g., azodicarbonamide or p-toluenesulfonyl semicarbazide), or sodium carbonate, and (d) a method which comprises mixing a molten thermoplastic resin with a polymer which reacts with a part of such molten thermoplastic polymer (for example, polyester, polyamide), such as polycarbonate.

Whichever method is used, it is necessary that when the thermoplastic resin is to be extruded from a slit die in the molten state, a gas is generated from the die together with the resin. Preferably, the various foamable substances described hereinabove are kneaded with the thermoplastic resin as fully as possible. If the kneading is not enough, it is difficult to obtain a reticulate fibrous sheet which is uniform and has the desired properties.

The foamable substance is used preferably in such an amount that the amount of the gas generated at the time of extruding the molten polymer phases from the slit exit is 10 to 100 ml, especially 15 to 60 ml, (NTP) per kilogram of the polymer.

The fibrous assembly so produced can be used in various applications.

Figure 6:
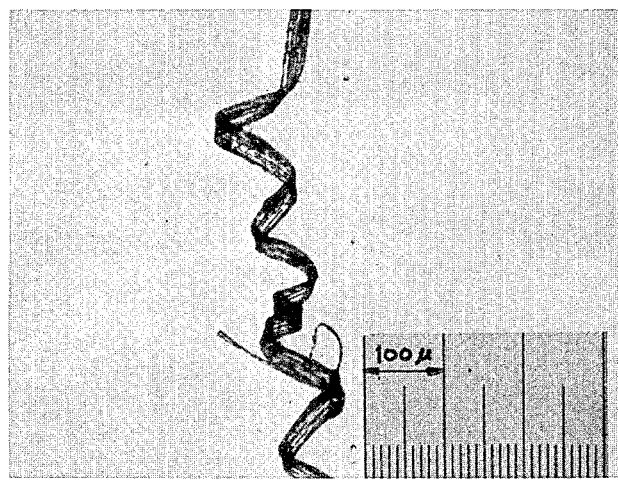
FIG. 6 is a microphotograph, taken right from above, of one fiber of the fibrous assembly shown in FIG. 1 which was treated with dry heat for about 1 minute at a temperature of about 150° to 165° C. One smallest graduation of the scale below the photograph corresponds to 10 microns.

The fibrous assembly shown in FIG. 1 is prepared from polymer phase B consisting of 70% by weight of 6-nylon and 30% by weight of polypropylene and polymer phase A consisting of 80% by weight of a polyester elastomer and 20% by weight of polypropylene; the individual fibers have an irregularly-shaped cross-sectional structure such that their cross sections in the transverse direction are asymmetrical and irregularly-shaped with different profiles and sizes from one another, and each fiber has a cross section of non-uniform shapes and sizes along its fiber axis. Moreover, at least 40% of the entire cross-sectional area of each fiber consists of at least two different polymer phases which are coalesced side-by-side as at least two irregular blocks, whereby when the fibrous assembly shown in FIG. 1 is treated with dry heat for about 1 minute at a temperature of about 150° to 165° C. in the relaxed state, there can be obtained a crimped fibrous assembly which contains about one crimp per about 100 microns as shown in FIG. 6. The resulting crimps are irregularly-shaped because of the irregularly-shaped cross-sectional structure of the fibers, and are oriented three-dimensionally. Hence, a crimped, very highly bulky fibrous assembly, which cannot be obtained by prior art techniques, can be produced from the fibrous assembly of this invention.

Figure 7:
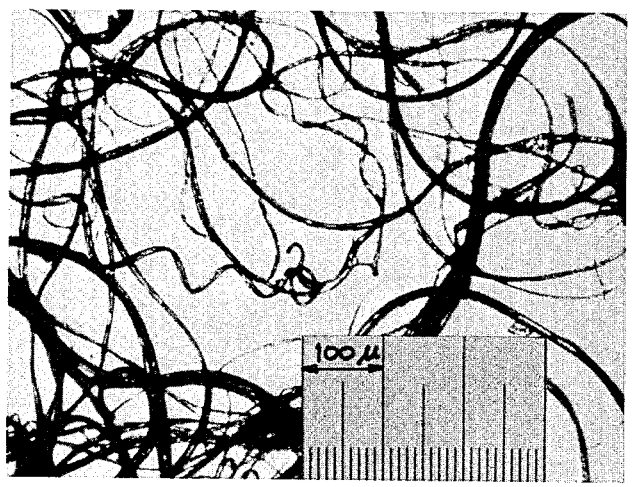
FIG. 7 is a microphotograph, similar to FIG. 6, of a part of a fiber obtained by drawing another fiber in the fibrous assembly heat-treated as above to about 2 times its original length in its longitudinal direction.

FIG. 7 is a microphotograph of another part of the heat-treated fibrous assembly shown in FIG. 6 which was taken after it was stretched to about 2 times in the longitudinal direction of the fibers. It is noted that as a result, the polymer phase A is partly separated from the polymer phase B to form fine-denier fibers in the form of whiskers.

Since in the fibrous assembly of this invention, at least two different polymer phases are coalesced side-by-side as blocks of irregular shapes and sizes, the dissimilar polymer phases are relatively easily split by a pulling force of stretching, a physical force such as beating or rubbing, and/or by stress caused by heat-treatment. Thus, a fibrous assembly of finer fibers can be produced.

According to another aspect of this invention, there is provided a fibrous assembly of many fibers, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; each of the individual fibers of said assembly having a non-uniform cross-sectional shape along its fiber axis; and said constituent fibers having (A) a portion having at least two different polymer phases coalesced side-by-side as at least two irregular blocks, and (B) a portion in which at least one of said at least two different polymer phases is separated from the other polymer phase to form at least two finer fibers (to be referred to as the fibrous assembly B of the invention).

The fibrous assembly of the invention is therefore a good fibrous material for reticulate fibrous webs and non-woven fibrous structures, and can be used in various applications including materials for producing non-woven fabrics, filter materials, packaging materials, materials for various apparel applications, heat insulating materials, cushioning materials, synthetic paper-like sheets, electric insulating materials, interior materials, sanitary materials, materials for motor vehicles, and agricultural materials. It is most suitable for use as apparel and filter materials. The fibrous assembly of this invention is also useful as various base materials for impregnation and for coating. Its application, however, is not limited to these specific uses.

In the preparation of the fibrous assembly of this invention, various additives such as fire retardants, coloring agents, stabilizers, absorbents and crystallization promotors may be incorporated, as required.

According to this invention, a bulky web-like fibrous assembly in which many fibers are crimped to intertwine the constituent fibers of the web three-dimensionally can be produced by stacking the desired number (at least two, preferably 10 to 10,000, especially preferably 20 to 6,000) of the unextended fibrous assemblies A or B or the products obtained by extending them in the transverse direction to some degree, extending the resulting sheet-like material in the transverse direction (i.e., in a direction at right angles to the longitudinal direction of the fibrous assembly in the unextended state) in an overfeed condition while holding both ends of the sheet-like material to form a reticulated fibrous web, and heat-treating the web by a heating medium such as hot air or radiation heating without direct contact with a hot plate.

The method of producing the bulky web-like fibrous assembly will be described below in detail with reference to FIG. 9.

At least two fibrous assemblies A of the invention, either in the unextended state or after being extended in the transverse direction to some extent, are stacked so that the fibers are aligned substantially in the longitudinal direction and the ends of the fibrous assemblies register with each other to form a sheet-like material 1. The sheet-like material 1 is sent to an extending zone 5 of the extending heat-treating apparatus shown in FIG. 9 through overfeed rolls 2 and 2' driven at speed $V_1$. A pair of extending belts having a number of needles 4 fixed perpendicularly to belts or chains are provided at both ends of the extending zone 5, and are adapted to travel at the same speed $V_2$ by means of rolls 3 and 3'. In the extending zone, the sheet-like material 1 fed in an overfeed condition is punched at both ends with the many needles 4 and so held, and while travelling together with the extending belts, is extended in a direction at right angles to the longitudinal direction of the sheet-like material 1.

The overfeed rate (Of) is defined by the following equation.

$$Of = \frac{\text{Feed rate } V_1 \text{ of the sheet-like material 1}}{\text{Running speed } V_2 \text{ of the extending belts}}$$

Desirably, the sheet-like material 1 is fed into the extending zone at an overfeed rate (Of) of from 1.1 to 5, preferably from 1.3 to 3.

In the transverse extension of the sheet-like material 1, the extension ratio can be varied according to the desired properties of the web-like fibrous assembly. Advantageously, it is usually from 3 to 25, preferably from 5 to 20. The extension ratio is defined as the ratio of the width ($L_2$) of the extended reticulated fibrous web to the width ($L_1$) of the sheet-like material 1 to be fed into the extending zone 5, i.e. $L_2/L_1$.

The reticulated fibrous web 7 extended to the desired ratio may, if desired, be preliminary pressed with press rollers 6 and 6' to make its thickness uniform. When it is desired to obtain a very bulky web-like fibrous assembly, the press rollers 6 and 6' are not essential.

The extended reticulated fibrous web 7 can be used in various applications as a material for forming a non-woven fibrous assembly. Since, however, the fibrous assembly A of this invention is characterized by having a very high degree of fine crimps, it is advantageous to crimp the extended reticulated fibrous web 7 by heat-treating it as shown in FIG. 9. The extended reticulated fibrous web 7 is introduced into a radiation-type heat-treating box 8. When the fibrous web 7 is heat-treated with the heat of radiation in the box, it is crimped to a high degree. As a result, the crimped bulky web-like fibrous assembly 9 is shrunken, and has a width $L_3$ shorter than the width $L_2$ before the crimping treatment.

The degree of crimping imparted to the reticulated fibrous web by the above heat-treatment is controlled by the heat-treating temperature and time. Advantageously, heating is carried out at a temperature near the softening point of the lower-melting polymer phase which constitutes the fibers in the web. The heat-treating time is usually from 5 seconds to 5 minutes, preferably from 15 seconds to 3 minutes.

The extended reticulated fibrous web of this invention can be formed into web-like fibrous assemblies having various functions and characteristics depending upon the conditions for crimping it by heat-treatment and upon the method of post-treatment of the crimped web. Typical examples of the embodiment are shown below.

(1) A method which comprises introducing the extended reticulated fibrous web 7 into a heat-treating box 8, sufficiently crimping it in the first half of the heating zone at a temperature not exceeding the softening point of the lower-melting polymer phase in the fibers constituting the web, subsequently heating the web in the second half of the zone at a relatively high temperature at which the lower-melting polymer phase can be melted, thereby to melt-adhere the fibers to one another and to obtain a three-dimensional reticulated web.

As stated hereinabove, when the fibrous assembly of this invention is cut in the transverse direction, the many individual fibers have asymmetric irregularly-shaped cross sections of different profiles and sizes, and the cross section of each fiber is nonuniform along the fiber axis. Moreover, in the cross sections of a majority of the fibers, at least two different polymer phases are coalesced side-by-side as at least two irregular blocks. Accordingly, by the heat-treatment in the first half of the heat-treating box, the many fibers of the sheet-like material are crimped at a very high percent crimp to effect three-dimensional intertwining of the crimped fibers. When the sheet-like material is further heated in the second half of the heat-treating box at a high temperature at which the lower-melting polymer phase can be melted, the lower-melting polymer phase in one fiber having an irregularly-shaped cross section adheres to a block of low-melting polymer phase and/or a high-melting polymer phase having a similar irregular shape at many small contact points.

According to the above method, therefore, the individual fibers are crimped three dimensionally to a high degree and integrated to provide a web of the desired thickness which is very bulky and has a soft hand and also superior drapeability.

(2) A method which comprises introducing the extended fibrous web 7 into a heat-treating box 8, heat-treating it therein at a temperature not exceeding the softening point of the lower-melting polymer phase of the fibers constituting the fibrous web to crimp the fibers sufficiently and thereby to form a bulky web having the constituent fibers intertwined three dimensionally by the crimps of the fibers, then impregnating the web with an adhesive composed of a material other than the polymers constituting the fibers to bond at least some of the fibers at at least some of the points of contact between the adjoining fibers, thus providing a three-dimensional unitary fibrous structure.

In the method (1), the fibers constituting the web are bonded thermally to one another partly through the lower-melting polymer phase to form a three-dimensional unitary fibrous structure, whereas in the method (2), the constituent fibers are bonded partly by means of an adhesive.

The adhesive used in this method may be any adhesive which can generally be used to bond fibers. It may be a powder or a liquid. Suitable adhesives are those which are composed of materials other than the polymers constituting the fibers. Materials having a lower melting point than the polymers constituting the fibers and being soft are preferred. The type and/or amount of the adhesive greatly affects the properties and hand of the resulting fibrous structure.

For example, when a relatively small amount of a soft adhesive is applied to a crimped bulky web, a bulky web having soft hand will be obtained. When a hard adhesive is applied, a bulky but relatively hard web will result.

Examples of adhesives that can be used in this invention include polyacrylate-type adhesives, polyvinyl acetate-type adhesives, and polyvinylidene chloride-type adhesives.

The aforesaid method gives a web of soft hand in which the individual fibers are finely crimped to a high degree and are partly integrated by means of the adhesive. When the amount of the adhesive increases, a web of a soft leather-like hand is obtained.

(3) A method which comprises introducing the extended fibrous web 7 into a heat-treating box 8, heat-treating it there at a temperature not exceeding the softening point of the lower-melting polymer phase in the fibers constituting the fibrous web thereby to crimp it fully, then withdrawing the heat-treated web from the heat-treating box 8 to obtain a bulky web-like fibrous assembly 9, and then hot-pressing the assembly. By performing the hot pressing at a relatively high temperature at which the lower-melting polymer phase in the fibers can be melted, the bulky web-like fibrous assembly 9 is compressed as a whole, and a thinner three-dimensional fibrous web than the web obtained by the method (1) is obtained.

It is also possible to hot-press one or both surfaces of the bulky web-like fibrous assembly under a predetermined pressure, thereby partly heat-adhering only the surface layers of one or both surfaces of the fibrous assembly and thus forming a three-dimensional web.

Thus, a fibrous web can be obtained which has a uniform thickness and in which the fibers are intertwined three-dimensionally throughout the web and the whole or only the surface layer is three-dimensionally heat-adhered.

(4) A method which comprises heat-treating the fibrous web 7 by a method similar to the method (1), (2) or (3) described above to form a crimped bulky web-like fibrous assembly 9 and then embossing the fibrous assembly by an embossing roll having the desired temperature and raised portions of the desired height. This method can afford an embossed web which has raised and depressed patterns in a wide variety of shapes and sizes and in which the thicknesses of the raised portions and/or the depressed portions vary, and the degree of heat adhesion also differ.

(5) A method which comprises hot-pressing a bulky three-dimensionally intertwined fibrous web obtained by heat-treating the fibrous web by a method similar to the method (1) or a three-dimensional integrated fibrous web obtained by heat-bonding the fibers of the above web partly, or a bulky web-like fibrous assembly obtained by a method similar to the method (2) or (3), and coating or impregnating the resulting fibrous web with various resins or resin solutions.

When a resin or a resin solution is coated on the surface of such a web, the surface of the web has increased abrasion resistance, and a beautiful appearance and physical and chemical properties which are inherent to a resin layer, and the strength of the entire web increases.

When such a web is impregnated with a resin or a resin solution, the degree of bonding of the fibers to one another increases, and the bonding among the fibers becomes firm. When the resin to be impregnated is a relatively soft resin, a soft bulky web having a leather-like hand can be obtained.

(6) A method of forming an assembly of ultrafine fibers, which comprises extracting at least one polymer component or polymer phase constituting the fibers from the aforesaid fibrous web 7, the heat-treated web-like fibrous assembly 9 obtained by the method (1) or (2), or the hot-pressed web-like fibrous assembly obtained by the method (4).

In this method, it is possible to extract one of the polymer components or polymer phases constituting the fibers, and leave the other polymer component or polymer phase. When a certain polymer phase forms a microblend of different polymers, only one component of the microblend can be extracted.

Thus, a web composed of ultrafine fibers can be easily obtained, and in a certain case, a web of a suede-like hand can be obtained.

Formation of a fibrous web in accordance with this invention is not limited to these specific examples, and other methods may be available. Or two or more of these methods can be performed in combination in a suitable sequence.

In an especially preferred embodiment, a three-dimensionally integrated web is formed by using as one of blocks of polymer phases a polymer having a lower melting point than the other polymer phase and at least containing an elastic polymer, and bonding the fibers to one another through the portion of the elastic polymer. The resulting web is bulky on the whole, and has a very soft hand. This is presumably because the fibers bonded to one another through the elastic polymer can move relatively freely with flexibility. Desirably, the elastic polymer includes, for example, polyurethane, polyolefin-type elastomers, and polyester-type elastomers, and polyester-type elastomers. It is especially preferred to use elastic polymers having a shore D hardness, measured by ASTMD2240, of not more than 65.

The web having very fine crimps and the webs obtained by treating it in accordance with methods (1) to (6) can be directly used as materials for the production of non-woven fibrous assemblies.

Webs having a suede-like very soft touch can be obtained by fibrillating the surfaces of such webs to provide naps. The embossed web obtained by the method (4), and the resin-coated or impregnated web obtained by the method (5) are suitable for fibrillation. When using such an embossed web, the clearance between the raised portions of the emboss is desirably not more than about 20 mm, preferably not more than 10 mm.

A laminated structure may be formed by stacking the desired number (at least two, preferably 10 to 10,000) of the reticulated structures obtained by extending the fibrous assembly of the invention, and incorporating into an arbitrary position of the laminate (for example, between the adjoining reticulated structures, or at one or both surfaces of the laminate) at least one third sheet-like material such as woven fabrics, knitted fabrics, nets, non-woven fibrous structures or films of materials other than the fibrous assemblies. The resulting laminated structure can have varying strength, flexibility, air-permeability, drapeability, etc. in contrast to the laminate not containing such a third sheet-like material.

Alternatively, various long or short fibers may be needle-punched onto the surface of the sheet-like material of various fibrous assemblies of this invention described hereinabove. This will afford a composite fibrous structure which is bulky and heat insulating.

As stated hereinabove, the fibrous assembly of this invention has a unique reticulated structure, and a unique fiber cross-sectional shape consisting of blocks of different polymers phases. Use of such a fibrous assembly can give reticulated fibrous structures or non-woven fibrous structures of very high utilitarian values. In particular, since the fibrous assembly of this invention can be finely crimped to a high degree, a soft bulky web can be obtained. By utilizing its bulkiness, it can find various applications.

The methods for measuring the shapes and properties of the fibrous assembly of this invention and the properties of the fibrous structures of the invention are described below. The conditions for producing the fibrous assembly are also described.

(1) Method of measuring the cross section of a fibrous assembly by an optical microphotograph:

The fibrous assembly is fixed with a white Japan wax/paraffin mixture. The fixed fibrous assembly is sliced to a thickness of 3 microns by a micronome. The slice is adhered to a cover glass coated with egg white and fixed in position. The excessive Japan wax/paraffin and egg white are removed by carbon tetrachloride and ethyl alcohol. The sample is observed under an optical microscope and photographed. The apparent long axis diameter ($a_i$) and the apparent short axis diameter ($b_i$) of the irregularly-shaped cross section are read on the photograph, and their arithmetic mean $$\frac{(a_i + b_i)}{2}$$

is calculated. These data are taken from the cross sections of 100 fibers chosen at random to obtain an apparent average denier size ($\overline{D}$).

$$\overline{D} = \frac{\sum_{i=1}^{100} \frac{(a_i + b_i)}{2}}{100} \quad (\overline{D} : \mu)$$

The average denier size ($\overline{de}$) is calculated in accordance with the following equation.

$$\overline{de} = \pi \left( \frac{\overline{D}}{2 \times 10^4} \right)^2 \times \frac{4\overline{P}}{(\overline{P} + 1)^2} \times 9 \times 10^5 \times d$$

$$\text{wherein } \overline{P} = \frac{\sum_{i=1}^{100} \left( \frac{a_i}{b_i} \right)}{100},$$

d is the arthmetic average specific gravity calculated from the proportions of constituent polymers.

The state of mixing of two different polymer phases in the cross section of a fiber is observed as follows:

When one polymer phase contains a large amount of a readily dyeable polymer such as nylon, the fibrous assembly is dyed and a photograph of its section is taken. When the polymer phases are difficult to differentiate by dyeing, a pigment is mixed with one polymer phase in an extruder, and a photograph of the cross section of the resulting fibrous assembly is taken.

(2) Draft ratio

It is calculated from the volume of a foamable polymer from a vent-type extruder conveyed by a gear pump, and determined in accordance with the following equation.

$$\text{Draft ratio} = \frac{\text{Take-up speed (cm/min.) of the fibrous assembly}}{\left(\begin{array}{c}\text{Volume (cm}^3\text{/min.)} \\ \text{of the polymer} \\ \text{conveyed by a} \\ \text{gear pump}\end{array}\right) \Big/ \left(\begin{array}{c}\text{Cross} \\ \text{sectional} \\ \text{area (cm}^2\text{)} \\ \text{of a discharge slit}\end{array}\right)}$$

$$= \frac{\text{Take-up speed (cm/min.) of the fibrous assembly}}{\text{Linear speed (cm/min.) of a molten polymer in a die exit}}$$

(3) Properties of the fibrous assembly:

The fibrous assembly is cut lengthwise so that its total denier (de) becomes about 10,000 de, and one twist is given per cm of its length. The sample is pulled at a pulling speed of 5 cm/min. with an interchuck distance being adjusted to 5 cm. The strength of the sample in the longitudinal direction is the quotient (m) obtained by deviding the maximum stress during pulling by its denier (de). The elongation in the longitudinal direction of the fibrous assembly is that at the maximum stress irrespective of the total denier.

(4) Crimps:

The fibrous assembly is heat-treated for 1 minute at a predetermined temperature. Then, while cutting the network structure, one fiber is taken out of the fibrous assembly. A load of 2 mg is exerted on the fiber, held in the taut state between two glass sheets, and fixed. The number of crimps is then measured by an optical microscope. After 20 replicates of this measurement, an average of the number of crimps is calculated, and made the average number of crimps per cm.

(5) Web formation:

(5)-(a) Measurement of the orientation angles of fibers in a web

Figure 9:
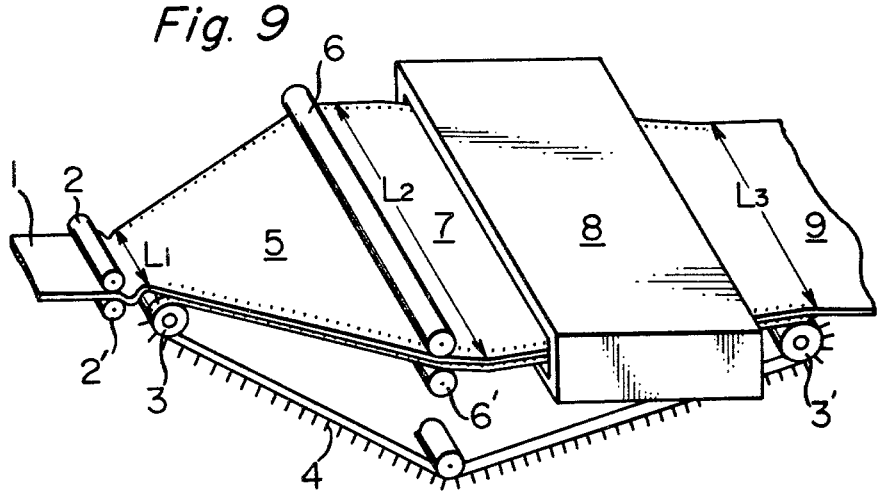
FIG. 9 is a schematic illustration of the extending heat-treating apparatus which can be used in accordance with the present invention.

One fibrous assembly is extended in the transverse direction in an apparatus of the type shown in FIG. 9. One reticulated sheet formed at zone 5 is held between two glass sheets and fixed. On a sheet of black paper, the angles of the fibers of the web with respect to the feeding direction of the fibrous web in the above apparatus are measured on all fibers located within an area of 10 cm$^2$, and are averaged to obtain an average fiber orientation angle ($\overline{\theta_u}$). Arithmetically, this can be roughly calculated in accordance with the following equation from the overfeed ratio (Of) of the fibrous assembly.

$$\frac{1}{\cos\overline{\theta_u}} = \frac{V_1}{V_2} = Of$$

(5)-(b) Definition of the extension ratio $$\text{Extension ratio} = \frac{\text{Width }(L_2\text{ cm}) \text{ of the fibrous assembly after extension}}{\text{Width }(L_1\text{ cm})\text{ of the fibrous assembly before extension}}$$

$L_1$ and $L_2$ are the widths of the web shown in FIG. 9.

(5)-(c) Definition of the overfeed ratio (Of)

$$Of = \frac{\text{Feed speed }(V_1,\text{ m/min.}) \text{ of the fibrous assembly}}{\text{Advancing speed }(V_2,\text{ m/min.}) \text{ of the extended web}}$$

(5)-(d) Shrinkage of the web $$\text{Shrinkage of the web (\%)} = \frac{(L_2) - (L_3)}{L_2} \times 100$$

$L_2$ and $L_3$ are the widths of the web shown in FIG. 9.

(6) Properties of the web:

(6)-(a) Density, (6)-(b) Thickness

A sample having an area of 10 cm$^2$ is cut off from the web, and the thickness of the sample is measured by a microgauge at any five points of the sample. An average of the thicknesses measured at the five points is measured. From the result, the density of one sample with an area of 10 cm$^2$ is calculated. The density of the web is defined as the average of three replicates.

(6)-(c) Average number of crimps

The web is held between two glass sheets, and the photographs of the surfaces of five different parts are taken by means of a stereomicroscope. From one photograph, the number of crimps of any four fibers is read. The average of the crimps of the twenty fibers in total is calculated, and made the average number of crimps (per cm) of the web.

(6)-(d) Strength at 1% elongation (in the longitudinal direction):

(6)-(e) Strength (in the longitudinal direction)

(6)-(f) Elongation (in the longitudinal and transverse directions)

Fibrous assemblies are stacked and extended and heat-treated to form a non-woven fibrous structure. A rectangular sample, 20 cm in length and 5 cm in width, is taken from the non-woven fibrous structure. The sample is pulled at a pulling speed of 5 cm/min. with an interchuck distance being adjusted to 10 cm by a tensile tester, and a strength-elongation curve is recorded on a chart. The strength at 1% elongation in the longitudinal direction of the non-woven fibrous structure is read from the resulting strength-elongation curve.

The strength and elongation at the maximum pulling stress are read from the strength-elongation curve.

Rectangular samples are sampled arbitarily from three parts of the non-woven fibrous structure both in the longitudinal and transvers directions, and the measurements were repeated. The averages of these measured values are determined, and made the strength (kg/5 cm) and elongation (%) of the non-woven fibrous structure.

The following Examples are given for illustrating the present invention in detail. It should be understood that the invention is not limited to these specific working examples.

EXAMPLE 1

The sketch of the apparatus used in this Example is shown in FIG. 8. In FIG. 8, polystyrene chips were fed into a hopper 1a provided at the top of a vent-type extruder 2a in section A, and polypropylene chips were fed into a hopper 1b provided at the top of a vent-type extruder 2b in section B. The temperature of the vent-type extruder 2b was maintained at 240° to 300° C., and the temperature of the vent-type extruder 2a was maintained at 270° to 310° C. The polymers were melted and extruded at these temperatures. Nitrogen gas at a pressure of 60 kg/cm² was introduced from the vent portion of each extruder so that its amount became 0.01% by weight based on the polymer. The molten polymers containing nitrogen were introduced into the upper portion of an I-die 4 through pipes 3a and 3b respectively and were associated there. The I-die 4 had a polymer associating chamber 5 having a length of about 24 cm, a width of about 2 cm and a height of about 3 cm and beneath it, a slit having a width of 300μ and a length of 24 cm. The mixed molten polymer containing nitrogen gas obtained as a result of association in the I-die 4 was heated to 280° C., and extruded from the slit 6. The extruded molten polymer was cooled by blowing air at a position within 5 mm from the exit of the slit through a cold air feed opening 7, and in the meantime, was taken up at a draft ratio of 160 to form a fibrous assembly.

The strength and elongation of the product were measured, and are shown in Table 1.

When the above fibrous assembly was dry heat-treated at 120° to 140° C. for 1 minute, a crimped fibrous assembly having the average denier size (de) and the average number of crimps shown in Table 1 was obtained.

EXAMPLES 2 TO 7

Fibrous assemblies were obtained by operating in the same way as in Example 1 except that the combination of polymer phases A and B, the type of the die, the slit clearance of the die, the temperature of the die and the draft ratio were varied as shown in Table 1. The results are also shown in Table 1.

EXAMPLES 8 TO 14 AND COMPARATIVE EXAMPLE 1

Fibrous assemblies were obtained by operating in the same way as in Example 1 by using an apparatus of the type shown in FIG. 8. The combination of the polymers and the extruding conditions were as shown in Table 2 below. In all of these Examples, the die used was a circular die having a diameter of 220 mm.

A number of the resulting fibrous assemblies were stacked, and extended in the widthwise direction while overfeeding them. Thus, a laminate of the fibrous assemblies was obtained. The laminate was preliminarily pressed, and heat-treated.

The number of the fibrous assemblies stacked, the overfeed ratios, the extended widths, the heat-treating temperatures, the presence or absence of press treatment and the properties of the resulting laminates are shown in Table 2.

For reference, Comparative Example 1 was performed in which polypropylene was used both as polymer phases A and B.

The polymers used in the above Examples and Comparative Example are tabulated below.

| Polymer | Manufacturer | Grade |
|---|---|---|
| Polypropylene (isotactic) | Ube Kosan Kabushiki Kaisha | S-115M (isotactic) |
| Atactic polypropylene | Mitsubishi Rayon K.K. | Special grade (atactic) |
| Polystyrene | Asahi Dow K.K. | Styron 666 |
| Ny-6 (nylon 6) | Teijin Limited | T-100 [η] = 1.1 |
| Polyethylene terephthalate (PET) | Teijin Limited | BVR [η] = 0.72 |
| Polycarbonate (PC) | Teijin Limited | W-1225 |
| Ethylene/ethyl acrylate copolymer (EEA) | Nippon Unicar K.K. | P-169 |
| Ionomer | Mitsui Polychemical K.K. | SA 1555 |
| Polybutylene terephthalate (PBT) | Teijin Limited | CH [η] = 1.1 |
| Polyethylene (PE) | Ube Kosan K.K. | J-2522 |
| Polyacetal | Polyplastics K.K. | Duracon |
| Acrylonitrile/styrene copolymer (AS) | Asahi Dow K.K. | Tyril 763 |
| Polyester Elastomer | Du Pont | Hytrel 4056 |
| Polystyrene elastomer | Shell | TR-1107 |

TABLE 1

| Run No. | Example 1 | Example 2 | Example 3 | Example 4 | Example 5 | Example 6 | Example 7 |
|---|---|---|---|---|---|---|---|
| | | | Combination of polymers | | | | |
| Composition (wt. %) of polymer phase A | Polystyrene (100) | Polystyrene (70) Ny-6 (30) | Ny-6 (19) Polypropylene (80) PC (1) | Polypropylene (80) EEA (20) | Polypropylene (60) Ny-6 (35) Ionomer (5) | Polypropylene (50) Polyethylene (40) Polyacetal (10) | Ny-6 (80) Polypropylene (20) |
| Composition (wt. %) of polymer phase B | Polypropylene (100) | Polypropylene (70) PET (30) | Polypropylene (40) Ny-6 (60) | PET (60) Ny-6 (20) Polypropylene (20) | PBT (70) Ny-6 (10) Polypropylene (20) | PET (60) Ny-6 (5) AS (35) | PET (70) PC (2) Polypropylene (28) |
| A:B volume ratio | 50:50 | 50:50 | 50:50 | 67:33 | 33:67 | 33:67 | 50:50 |
| | | | Extruding conditions | | | | |
| Configuration of the die | I (240 mm long) | T (240 mm long) | Circular (220 mm in diameter) | Circular (220 mm in diameter) | Circular (220 mm in diameter) | Circular (220 mm in diameter) | Circular (220 mm in diameter) |
| Die slit Clearance (μ) | 300 | 300 | 200 | 200 | 100 | 100 | 100 |

TABLE 1-continued

| Run No. | Example 1 | Example 2 | Example 3 | Example 4 | Example 5 | Example 6 | Example 7 |
|---|---|---|---|---|---|---|---|
| Die temperature (°C.) | 280–310 | 260–310 | 220–290 | 240–280 | 220–280 | 240–280 | 240–290 |
| Draft ratio | 160 | 120 | 160 | 120 | 200 | 160 | 150 |
| Properties of the fibrous assembly | | | | | | | |
| Strength(longitudinal) (g/de) | 0.2 | 0.2 | 0.4 | 0.4 | 0.5 | 0.4 | 0.3 |
| Elongation (longitudinal) (%) | 70 | 100 | 180 | 180 | 190 | 160 | 180 |
| Crimping | | | | | | | |
| Crimping temperature (°C.) | 120–140 | 130–160 | 130–160 | 120–150 | 120–160 | 120–150 | 140–180 |
| Average denier size after crimping (de) | 1.2 | 1.9 | 0.7 | 0.8 | 0.2 | 0.4 | 0.5 |
| Average number of crimps per cm after crimping | 96 | 105 | 113 | 102 | 115 | 110 | 105 |

TABLE 2

| | Run No. | Example 8 | Example 9 | Example 10 | Example 11 | Example 12 | Example 13 | Example 14 | Example 15 | Comparative Example 1 |
|---|---|---|---|---|---|---|---|---|---|---|
| Combination of polymers | Composition (wt. %) of polymer phase A | Polypropylene (100) | Polypropylene (50) Polyethylene (50) | Polypropylene (50) Polyethylene (50) | Polyester elastomer (100) | Atactic polypropylene (80) Isotactic polypropylene (20) | Polystyrene elastomer (100) | Polyester elastomer (80) Polypropylene (20) | Polystylene (30) Ny-6 (70) | Polypropylene (100) |
| | Composition (wt. %) of polymer phase A | Ny-6 (100) | PET (70) Polypropylene (30) | Ny-6 (100) | Ny-6 (100) | Ny-6 (70) Isotactic polypropylene (30) | PET (70) Polypropylene (30) | Ny-6 (70) Polypropylene (30) | Polystyrene (30) PET (70) | Polypropylene (100) |
| | A:B volume ratio | 50:50 | 50:50 | 50:50 | 50:50 | 50:50 | 50:50 | 50:50 | 50:50 | 50:50 |
| Extruding conditions | Die slit clearance (μ) | 100 | 100 | 60 | 100 | 100 | 100 | 100 | 100 | 100 |
| | Die temperature (°C.) | 230–290 | 250–290 | 230–290 | 230–290 | 220–290 | 250–290 | 230–290 | 280–310 | 260–280 |
| | Draft ratio | 160 | 140 | 150 | 140 | 140 | 130 | 160 | 130 | 160 |
| Properties of the fibrous assembly | Strength longitudinal) (g/de) | 0.5 | 0.3 | 0.5 | 0.4 | 0.4 | 0.4 | 0.5 | 0.2 | 0.6 |
| | Elongation (longitudinal) (%) | 260 | 100 | 240 | 150 | 180 | 150 | 290 | 90 | 280 |
| Laminating conditions | Number of fibrous assemblies laminated | 100 | 200 | 500 | 200 | 500 | 200 | 200 | 500 | 200 |
| | Sheet width (L₁) (cm) | 20 | 20 | 20 | 20 | 20 | 20 | 20 | 20 | 20 |
| | Overfeed rate Extended width (L₂) (cm) | 1.8 160 | 1.8 160 | 2.0 160 | 1.8 | 2.0 | 1.8 | 2.0 | 2.0 | 2.0 |
| | Shrunken width (L₃) (cm) | 115 | 115 | 115 | 160 115 | 160 115 | 160 115 | 160 115 | 160 115 | 160 115 |
| | Heat-treating temperature (°C.) | 140–160 | 130–145 | 125–140 | 150–165 | 140–150 | 145–155 | 150–165 | 120–150 | 135–150 |
| | Press treatment | No | Yes | No | Yes | No | Yes | No | No | No |
| | Embossing treatment | No | No | No | No | No | No | No | No | No |
| Properties of the laminated structure | Density (g/cm³) | 0.08 | 0.21 | 0.08 | 0.22 | 0.09 | 0.23 | 0.09 | 0.09 | 0.09 |
| | Thickness (mm) | 3 | 1 | 10 | 1.0 | 10 | 1.0 | 50 | 10 | 5.0 |
| | Number of crimps per cm | 60–70 | 85–90 | 80–85 | 80–85 | 85–90 | 85–90 | 80–85 | 70–80 | 25–30 |
| | Strength at 1% elongation (kg/5cm) | 0.21 | 0.25 | 0.18 | 0.13 | 0.19 | 0.14 | 0.06 | 0.15 | 1.1 |
| | Strength (longitudinal) (kg/3cm) | 2.4 | 7.3 | 7.3 | 7.4 | 7.5 | 6.9 | 3.4 | 6.8 | 4.0 |
| | Elongation (longitudinal) (%) | 110 | 105 | 105 | 105 | 110 | 110 | 105 | 105 | 95 |
| | Elongation (transverse) (%) | 65 | 60 | 70 | 70 | 60 | 70 | 70 | 65 | 60 |

*¹Treated after adding 30% by weight of a binder.
*²The polystyrene component of the web was extracted by dissolving.

What we claim is:

1. A fibrous assembly of many fibers, the individual constituent fibers being interconnected at random in a spaced-apart relationship so that when spread in a direction at right angles to the longitudinal axes of the fibers, said assembly forms a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; at least 40% of the entire cross-sectional area of each fiber consisting of at least two different polymer phases which are coalesced side-by-side as at least two irregular blocks; and each of the individual fibers of said assembly having a non-uniform cross-sectional shape along its longitudinal axis.

2. A fibrous assembly of many polymeric fibers, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; each of the individual fibers of said assembly having a non-uniform cross-sectional shape along its fiber axis; and said constituent polymeric fibers having (A) a portion having at least two different polymer phases coalesced side-by-side as at least two irregular blocks, and (B) a portion in which at least one of said at least two different polymer phases is separated from the other polymer phases to form at least two finer fibers.

3. A fibrous structure comprising a laminate of at least two fibrous assemblies each of which is spread in a direction at right angles to the longitudinal axes of the fibers of said assembly to form a reticulated structure, and in which many fibers are crimped so that the constituent fibers of the laminate are intertwined three-dimensionally; wherein each of said fibrous assembly consists of many fibers, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; at least 40% of the entire cross-sectional area of each fiber consisting of at least two different polymer phases which are coalesced side-by-side as at least two irregular blocks; and each of the individual fibers of said assembly having a non-uniform cross-sectional shape along its longitudinal axis.

4. A fibrous structure comprising a laminate of at least two fibrous assemblies each of which is spread in a direction at right angles to the longitudinal axes of the fibers of said assembly to form a reticulated structure, and in which many fibers are crimped so that the constituent fibers of the laminate are intertwined three-dimensionally; wherein each of said fibrous assemblies consists of many fibers, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; each of the individual fibers of said assembly having a non-uniform cross-sectional shape along its fiber axis; and said constituent fibers having (A) a portion having at least two different polymer phases coalesced side-by-side as at least two irregular blocks, and (B) a portion in which at least one of said at least two different polymer phases is separated from the other polymer phase to form at least two finer fibers.

5. The fibrous structure according to claim 3 or 4 wherein at least some of the fibers are bonded to one another at some of the points of contact of adjoining fibers, whereby at least a part of the laminate is three-dimensionally integrated.

6. The fibrous structure according to claim 5 wherein said bonding is effected by the heating of the lower-melting polymer phase constituting the fibers to bond the others directly.

7. The fibrous structure according to claim 5 wherein said bonding is effected by means of an adhesive other than the polymers constituting the fibers.

8. The fibrous structure according to claim 5 wherein the lower-melting polymer phase constituting the fibers at least contains an elastic polymer component, and the fibers are bonded through the elastic polymer component.

9. The fibrous structure according to claim 3 which is in the form of a web or sheet.

10. The fibrous structure according to claim 3 which is in the form of a web or sheet and is embossed.

11. The fibrous structure according to claim 3 wherein at least one of other woven fabrics, knitted fabrics, nets, non-woven fibrous structures or films is incorporated in an arbitrary position of said laminate of the fibrous assemblies.

12. The fibrous structure of claim 3 comprising a laminate of from 10 to 10,000 of said fibrous assemblies.

13. The fibrous structure of claim 4 comprising a laminate of 10 to 10,000 of said fibrous assemblies.

14. A process for producing a fibrous assembly, the individual constituent fibers being interconnected at random in a spaced-apart relationship so that when spread in a direction at right angles to the longitudinal axes of the fibers, said assembly can form a continuous integral reticulated structure; said individual fibers having asymmetrical irregularly-shaped cross sections of substantially different profiles and sizes from one another when said assembly is cut at right angles to the longitudinal axes of the fibers at an arbitrary point therealong; at least 40% of the entire cross-sectional area of each fiber consisting of at least two different polymer phases which are coalesced side-by-side as at least two irregular blocks; and each of the individual fibers of said assembly having a non-uniform cross-sectional shape along its longitudinal axis; which comprises associating melts of at least two different foamable polymer phases in the form of layers, extruding the associated mass from an elongated slit having a narrow clearance of 30 to 300 microns as superimposed layer-like streams in the direction of the narrow width, simultaneously foaming the polymer phases, and taking up the extrudate at a draft ratio of from 50 to 250 while cooling the extrudate at a location between the slit exit and a point 10 mm below the exit.

15. The process according to claim 14 wherein the draft ratio is from 100 to 200.

16. The process of claim 14 wherein the slit has a clearance of 30 to 150 microns.

17. The process of claim 14 wherein the extrudate is cooled at a location between the slit exit and a point 5 mm below the exit.

* * * * *